United States Patent [19]

Banyas et al.

[11] 3,790,087

[45] Feb. 5, 1974

[54] BURNER APPARATUS FOR FORMING A FINISH ON A GLASS CONTAINER

[75] Inventors: John D. Banyas, Toledo; Edward A. Ross, Waterville, both of Ohio

[73] Assignee: Owens-Illinois, Inc., Toledo, Ohio

[22] Filed: Aug. 29, 1972

[21] Appl. No.: 284,565

Related U.S. Application Data

[62] Division of Ser. No. 77,425, Oct. 2, 1970, Pat. No. 3,726,559.

[52] U.S. Cl................. 239/418, 239/433, 239/555, 239/568
[51] Int. Cl. ... F23d 11/10, F23d 13/40, F23d 15/00
[58] Field of Search ........... 239/418, 433, 568, 555

[56] References Cited
UNITED STATES PATENTS

| | | | |
|---|---|---|---|
| 2,484,123 | 10/1949 | Scherl | 239/555 |
| 1,888,791 | 11/1932 | Cole | 239/418 |
| 1,373,565 | 4/1921 | Kunitz | 239/418 |
| 3,503,557 | 3/1970 | Hutton, Jr. | 239/433 |
| 3,477,646 | 11/1969 | Lytle | 239/433 |
| 2,149,526 | 3/1939 | Johnson | 239/418 |
| 2,407,370 | 9/1946 | Hughey | 239/418 |
| 3,615,054 | 10/1971 | Botz | 239/568 |

Primary Examiner—Lloyd L. King
Attorney, Agent, or Firm—J. R. Nelson et al.

[57] ABSTRACT

A burner apparatus for forming a finish on a hollow glass article on a production line, such as a glass container. Glass containers having an integrally formed moil portion on the upper end of the container body portion are loaded in sequence on a continuously moving endless conveyor which carries the containers in line through a heating zone. During their transit through the heating zone, the containers pass between a linear row of opposed burners which direct a high intensity row of flame jets accurately against a narrow portion of the container body to first thermally sever the moil portion from the body and to subsequently form a beaded finish on the container. The containers are rotated during their passage through this set of burners at a controlled rate to achieve the desired finish formation. The burner assembly includes top and bottom housings and an intermediate shim plate that define together plural slots connected to a fuel chamber that is in a recess longitudinally of the burner housing. Air and fuel are supplied to the recess chamber for combustion upon exit from said slots.

2 Claims, 8 Drawing Figures

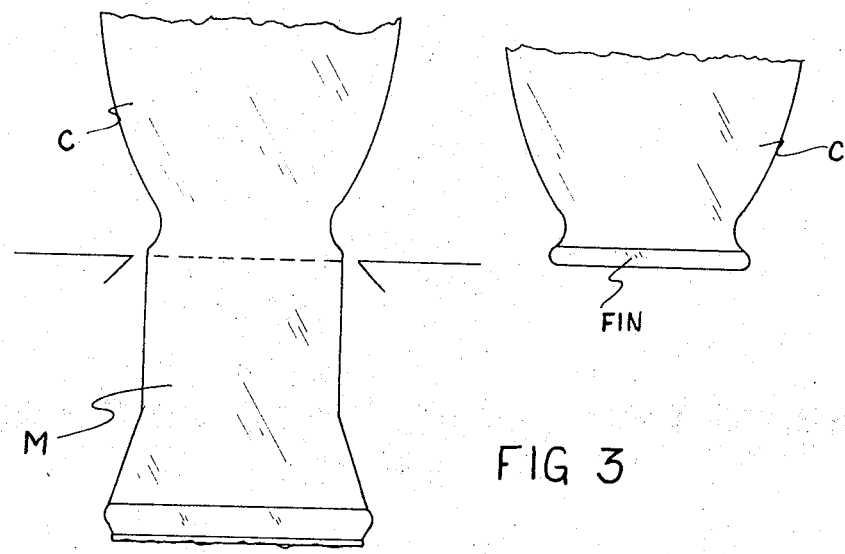

BURNER APPARATUS FOR FORMING A FINISH ON A GLASS CONTAINER

RELATED PATENTS AND APPLICATIONS

This application is a divisional of our copending parent application Ser. No. 77,425, filed Oct. 2, 1970, now U.S. Pat. No. 3,726,559.

The machine disclosed in this application forms a portion of the overall container production line disclosed and claimed in the commonly owned copending application of Richard A. Heaton, et al., Ser. No. 24,721, filed Apr. 1, 1970, now U. S. Pat. No. 3,703,363. Containers are loaded into the machine of the present invention by a transfer machine which forms the subject matter of another commonly owned copending application of John D. Banyas, Ser. No. 825,850, filed May 19, 1969, now U. S. Pat. No. 3,590,982. The container which is handled by the machine of the present invention forms the glass portion of the composite container disclosed and claimed in Heaton's U. S. Pat. No. 3,372,826.

BACKGROUND OF THE INVENTION

As explained in detail in the aforementioned Heaton et al. U.S. Pat. No. 3,703,363, the glass container of Heaton U.S. Pat. No. 3,372,826 is initially formed in a ribbon-type forming machine with a moil or waste portion formed integrally with the container body and projecting upwardly from the container body. The purpose of the integrally formed moil is to enable the freshly formed container to be handled immediately upon its removal from the forming machine, at a time when the temperature of the freshly formed container is so high that mechanical handling elements may mar or deform those portions of the container with which they come in contact. The transfer machine of the aforementioned Banyas U.S. Pat. No. 3,590,982 is designed to take the freshly formed containers from the ribbon machine by grasping the moil portion of the freshly formed containers, thus avoiding contact with that portion of the article which will form the ultimate finished container.

The function of the present machine and method is to receive the containers with the integrally formed moil from the transfer machine of Banyas U.S. Pat. No. 3,590,982, to sever the moil portion and to form the container finish after the moil has been severed. The present invention is especially concerned with the structure of the burners employed in the moil severing and finish forming steps.

SUMMARY OF THE INVENTION

The burner apparatus of the present invention is utilized in a machine that takes the form of an endless chain conveyor driven in continuous movement along an endless path and carrying a series of uniformly spaced container chuck assemblies.

Containers with integrally formed moil portions are loaded onto the individual chucks in an upright position at a loading point on the horizontal upper run of the endless conveyor. Each chuck includes a sprocket which is engageable with various chains mounted along selected portions of the chuck path to drive the chuck in rotation as it passes along the chain. After the containers are loaded onto the chucks, they pass along the upper run of the conveyor between a pair of opposed "pre-heat" burners which extend along opposite sides of the path of movement of the containers. The "pre-heat" burners extend along the upper run of the conveyor and around the first end turn section and function to maintain the temperature of the container within a predetermined range during its passage of this portion of their path. A stationary chain engages the chuck sprockets on the upper run to drive the chucks and supported containers in continued rotation to achieve an even exposure of the containers to the "pre-heat" burners.

After the containers pass around the end turn section, they are inverted and move into a main burner section which includes opposed burners of novel construction extending along the lower run of the conveyor at opposite sides of the path of movement of the containers. The main burners produce a linear row of narrow flame jets which are directed accurately to a narrow band on the containers at the juncture of the moil portion and container body portion. During their passage through the main burners, the chuck sprockets are engaged by one run of an endless chain which is driven by a reversible variable speed drive in a direction and speed such that a selected rate of rotation of the containers is maintained during their passage through the main burners. During their transit through the first section of the main burners, the moil portion is thermally severed by the action of the flame jets and drops freely from the container body. A beaded finish is formed on the severed edge as the containers pass through the remaining section of the burners. The burners are constructed from individual burner sections, so that different fuels, fuel pressures, flame widths, etc. may be employed at different sections of the burner. The burner sections are mounted for adjustment vertically relative to the container path, horizontally toward and away from the container path and also pivotally about a horizontal axis parallel to the container path so that the angle of impingement of the flame jets on the containers can be regulated.

Although the machine and method are specifically described in terms of handling a specific glass container, the invention is equally capable of handling other types of glass containers or hollow glass articles initially formed as a blank with an integral moil, such as electric light bulb envelopes or glass tumblers, for example.

Other objects, features and advantages of the invention will become apparent in the following specification and in the drawings.

IN THE DRAWINGS

FIG. 2 is a partial side detail view of the finish end portion of a container blank as received by the burn-off machine;

FIG. 3 is a detail side elevational view of the finish portion of the container after the finish has been formed by the burn-off machine;

GENERAL DESCRIPTION

Figure 1:
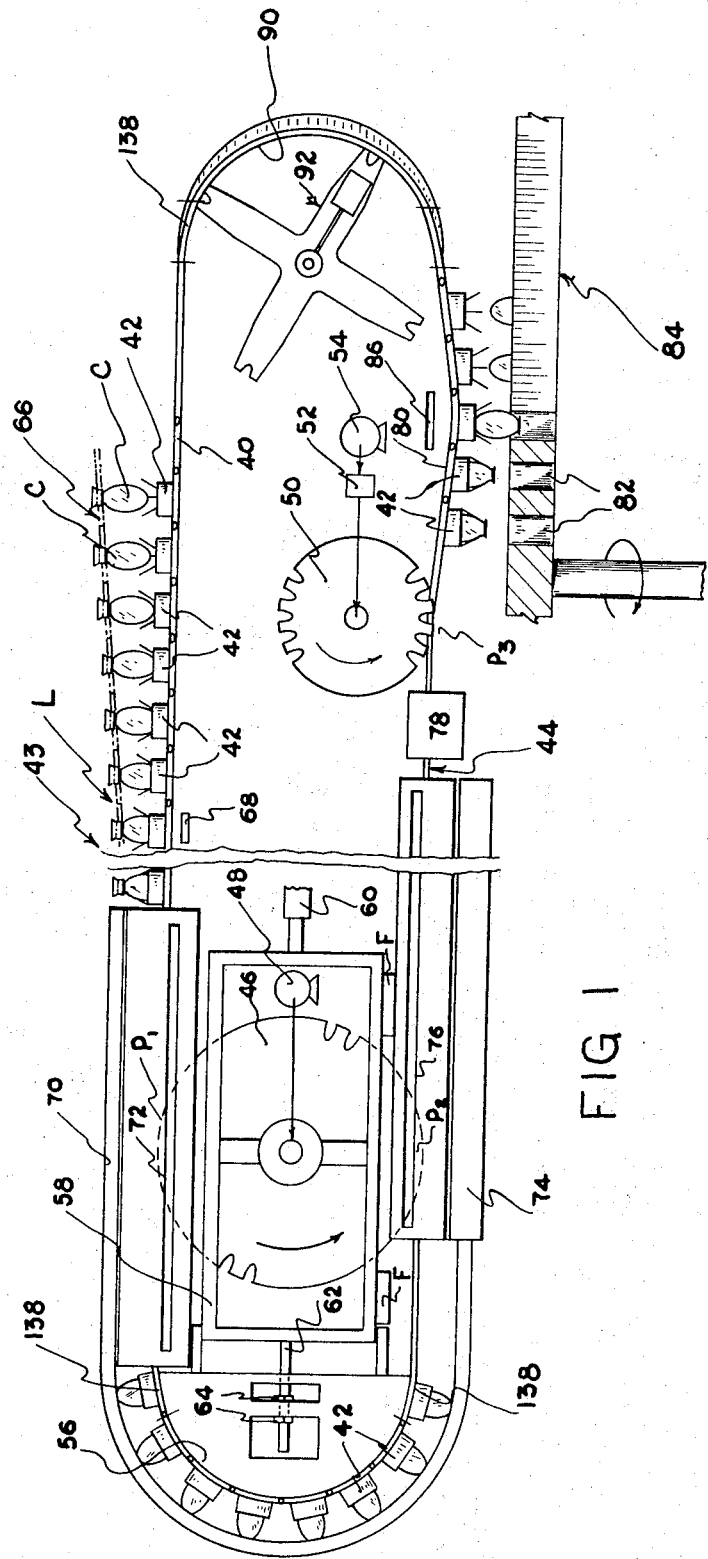
FIG. 1 is a very schematic side elevational diagram of a burn-off machine embodying the present invention.

The function of the burn-off machine of FIG. 1 is to receive containers C (FIGS. 2 and 3) having an integral moil or waste portion M projecting upwardly from the container finish, to burn off the moil M and form a beaded finish FIN (FIG. 3) on the container, and to subsequently deposit the container into a pocket conveyor.

The burn-off machine forms a part of the overall container production line which is the subject matter of U. S. Pat. No. 3,703,363. In this particular production line, the bulb-shaped containers are formed on a ribbon machine with an integral moil portion projecting upwardly from the container mouth or finish. The containers are severed from the ribbon on the ribbon machine at the top of this moil portion and the moil portion is simultaneously grasped by a finger assembly on a transfer machine which forms the subject matter of U.S. Pat. No. 3,590,982. The finger assembly of the transfer machine is adapted to grasp the freshly formed container by the moil portion, because at the time the container is engaged by the transfer machine, it is still at a relatively high temperature from the forming operation and susceptible to being marred or deformed by the finger assemblies of the transfer machine. To complete the container, it is necessary that the moil portion be subsequently severed from the container and that a beaded finish be formed at the point of severance.

In FIG. 1, an extremely schematic diagram of the burn-off machine is presented for the purpose of affording an overall view of the machine and the relationship of the individual mechanisms and components to each other. The various components and mechanisms will be individually described in detail below, their relative sizes and locations being such that it is not possible to show details of all mechanisms in a single view.

Referring to FIG. 1, the burn-off machine takes the form of an endless chain conveyor, the chain of which is schematically illustrated at 40. A series of uniformly spaced container chucks 42 are mounted upon and carried by the chain in continuous movement along an endless path having horizontally extending upper and lower runs 43 and 44 respectively. Chain 40 is supported and guided in movement along its endless path by chain tracks mounted upon the machine frame F, now shown in FIG. 1, but described in greater detail below. Chain 40 is driven along its endless path in a counterclockwise direction as viewed in FIG. 1 by a main drive sprocket 46 driven in in turn by a main drive motor 48, and also by a slave drive sprocket 50 which is drivingly coupled through a slip clutch 52 to a slave drive motor 54.

Main drive sprocket 46 is meshed with both the upper and lower run of chain 40 at points P-1 and P-2 and supplies the major portion of the driving force for chain 40. The the remaining minor portion of the necessary driving force is supplied by slave drive sprocket 50 which is meshed with the lower run of chain 40 at point P-3 and driven by its drive motor 54 through slip clutch 52. Motor 54 is driven at a rate such that slave drive sprocket 50 attempts to move chain 40 at a faster speed than chain 40 is driven by main drive sprocket 46, part of the excess power being applied to tension chain 40 and the remainder absorbed in slip clutch 52. The purpose of slave drive sprocket 50, in addition to that of supplying a portion of the motive power to cahin 40 is to maintain a constant tension in that portion of chain 40 on lower run 44 between points P-2 and P-3. By employing two drives, the magnitude of the chain tension is reduced — there are two drives each effectively pulling a short length of chain rather than a single drive pulling one long length of chain.

Figure 4:
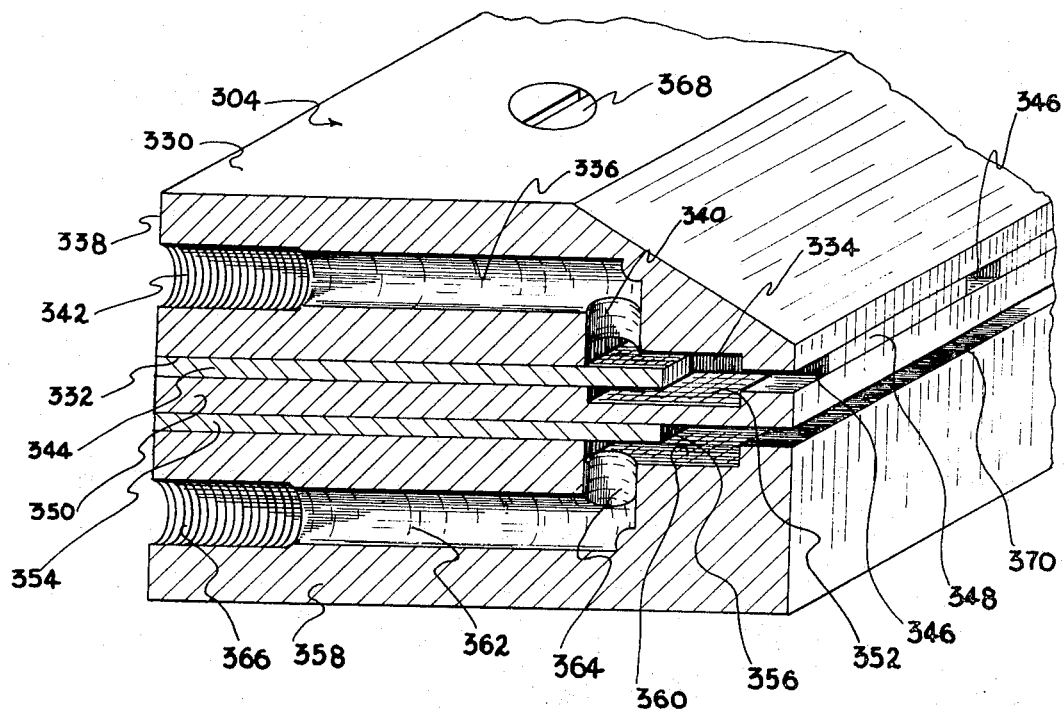
FIG. 4 is a perspective view of a portion of a main burner module, partially in cross-section.

Overall tensioning of the chain is accomplished by mounting main drive sprocket 46 and that portion of the chain track defining the left-hand end turn 56 of the chain path upon a sub-frame 58 which is mounted for sliding movement from right to left and vice versa as viewed in FIGS. 1 and 4 upon the fixed frame F, of the burn-off machine. Sub-frame 58 can be shifted horizontally as viewed in FIG. 1 relative to the fixed frame as by a screw jack mechanism schematically illustrated at 60 to establish overall chain tension. Adjustment of sub-frame 58 relative to the fixed frame by the jack mechanism 60 establishes the tension of the major portions of the horizontal upper and lower runs 43 and 44 of chain 40 — i.e., that portion of the chains to the right of the points P-2 and P-3 enmeshed with sprocket 46. While it is desired to have an adequate amount of tension in the horizontal runs of the chain, it is desired to have the chain somewhat looser in its passage around end turn 56 and thus end turn 56 is in turn mounted upon sub-frame 58 for horizontal adjustment relative to sub-frame 58 by a threaded adjustment rod fixed to sub-frame 58 and coupled to end turn 56 by a pair of nuts 64.

Containers C are loaded upon chucks 42 of the burn-off machine by the transfer machine of the aforementioned Banyas U.S. Pat. No. 3,590,982 partially indicated at 66 in FIG. 1. The containers C, supported from their moil portion M upon transfer machine 66 are lowered into chucks 42 as the transfer machine and chucks move in synchronism to the left along upper run 43 of the burn-off machine. Support of the containers is transferred from transfer machine 66 to the individual chucks 42 at the loading point designated L on FIG. 1. As described in greater detail below, the chucks 42 include three container gripping fingers which are maintained in an open position until the container C is deposited by transfer machine 66 onto chuck 42, at which time the chuck fingers are closed by a closing mechanism schematically indicated at 68.

As the chucke 42 with their supported containers move to the left along upper run 43 away from loading point L, the containers pass between a pair of opposed elongate burners 70 which apply heat to the container around the region at which the moil portion is integrally joined to the container. Burners 70 are sometimes referred to as "pre-heat" burners although their function might be more accurately described as that of maintaining a controlled rate of cooling of the finish region of the container during its transit between loading point L and the location at which the moil is burned off. The containers, at the time they are received by the burn-off machine at loading point L are at a temperature of between 900° and 1000°F and at the commencement of the actual burning off of the moil it is desired to have the temperature of the container at between 800° and 900°F. Burners 70 can be regulated to achieve the desired temperature drop which would otherwise be dependent on such variable factors as ambient plant temperature, line speed, etc.

In order to achieve even exposure of the container around its entire circumference to the action of opposed burners 70, the container chucks and their supported containers are driven in rotation by an upper spin cycle device schematically indicated at 72. As indicated in FIG. 1, burner 70 is continued around end turn 56 and terminates at the upstream end of the main burn-off and finish forming burners 74. As the chucks enter the main burners 74, they are operatively engaged and again driven in rotation by a second spin cycle mechanism schematically indicated at 76.

As the chucks 42 with the supported containers pass around end turn 56, the container is moved into an inverted position, with the moil portion which is to be burned off now being at the lower end of the container as supported on the chuck so that the moil portion can drop freely from the container upon severance. Main burner 74 is constructed with a first or burn-off section of opposed burners which extend along the line of travel of the finish portion of the container and direct narrow high-intensity flame jets, in a manner to be described in more detail below, at the line of desired severance. During its passage between the main burners, the container is continuously driven in rotation at a controlled rate by spin cycle mechanism 76. The heat applied by the burners is adjusted so that severance of the moil portion from the container will occur when the container is approximately one half of the way through main burners 74. During the latter half of its passage through main burner 74, the burners continue to apply heat to the severed edge of the container and this heating action, combined with the rotation of the container by spin cycle mechanism 76, acts to form a beaded finish on the container.

After the containers pass beyond main burners 74, they are conveyed through an inspection station 78 which inspects the newly formed finish and is operable, by manipulation of the chuck 42, to cause ejection of a container having a malformed finish.

After passing to the right beyond inspection station 78, chain 40 and the supported chucks pass along a downwardly inclined portion 80 of the chain path to lower the inverted containers partially into container receiving pockets 82 of a schematically illustrated pocket conveyor 84 driven in synchronism with chucks 42 of the burn-off machine. Chucks 42 are constructed in a manner such that during their passage along inclined section 80, the containers are maintained in a vertical position for free entry into pockets 82. A chuck opening mechanism schematically illustrated at 86 causes the chucks to open at the lower end of inclined path section 80 to release the container to permit it to freely drop the remaining distance into the aligned pocket 82 of conveyor 84.

During its passage around the right-hand end turn 90 of its endless path, chain 40 passes into operative relationship with a chain lubricating mechanism designated generally 92 which is periodically actuated to lubricate the chain.

CHAIN DRIVE AND TENSIONING ADJUSTMENTS

CHUCK ASSEMBLY

Details of the chain and track construction, the chain drive and tensioning adjustments, and the chuck assembly are set forth in U.S. Pat. No. 3,726,559, of which this application is a divisional application, and also in a commonly owned copending divisional application of U.S. Pat. No. 3,726,559 identified as Ser. No. 284,700, filed Aug. 30, 1972.

BURNER ASSEMBLY

Details of the burner assembly are best shown in FIGS. 4 through 8 inclusive.

Main burner 74 is constructed from a series of like burner modules designated generally 280. In the plan view of FIG. 7, one complete module is shown, with portions of two adjacent modules appearing at the top and bottom of this Figure.

Each module 280 consists of two separate halves 282a and 282b respectively mounted on opposite sides of the path of movement of the containers C. The halves 282a and 282b are identical and are mounted for independent horizontal, vertical and pivotal adjustment relative to the machine frame F. A single set of reference numerals will be employed to identify the parts of the two halves 282a and 282b.

Figure 6:
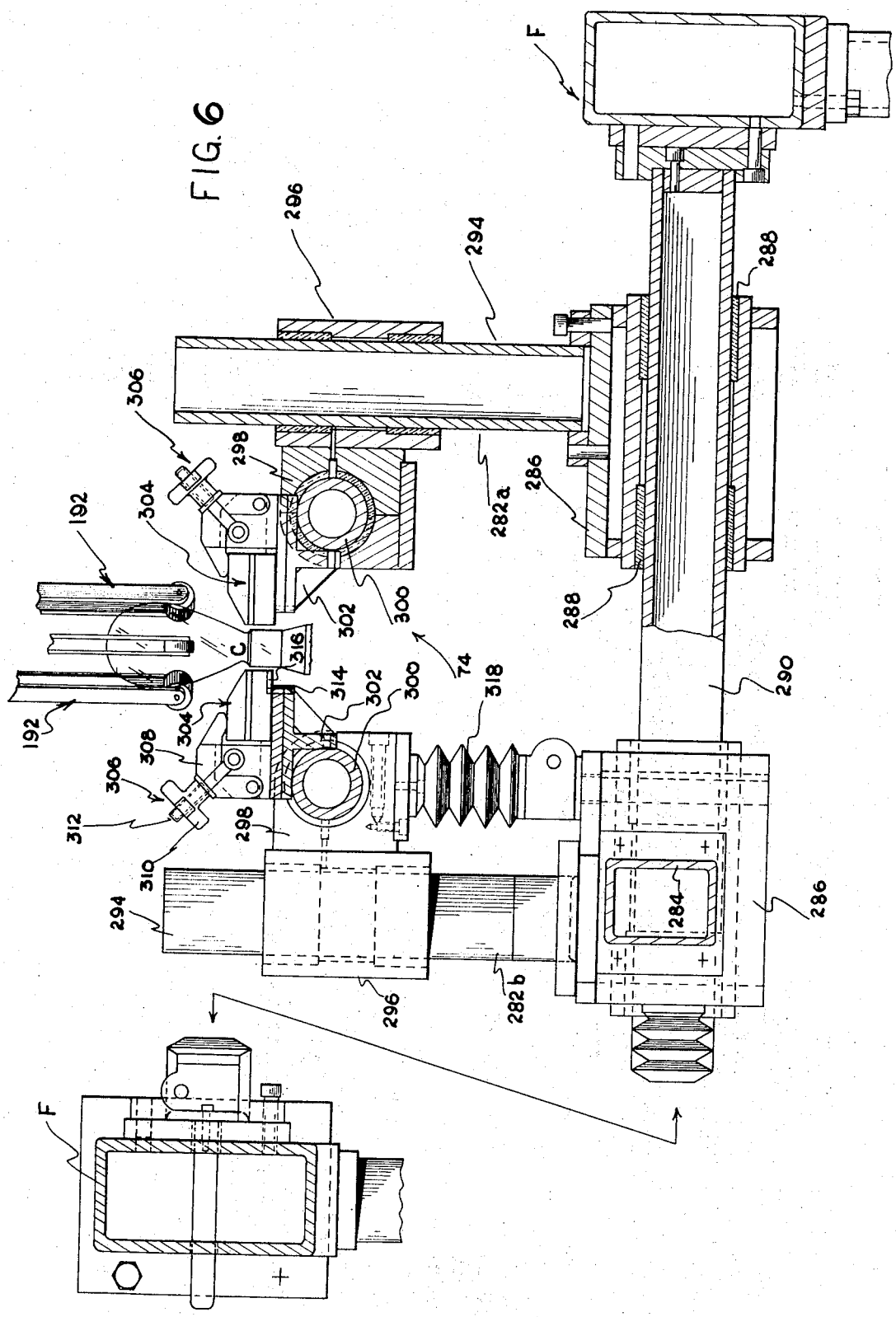
FIG. 6 is a detail cross-sectional view, taken in a vertical plane, through the main burner.
Figure 7:
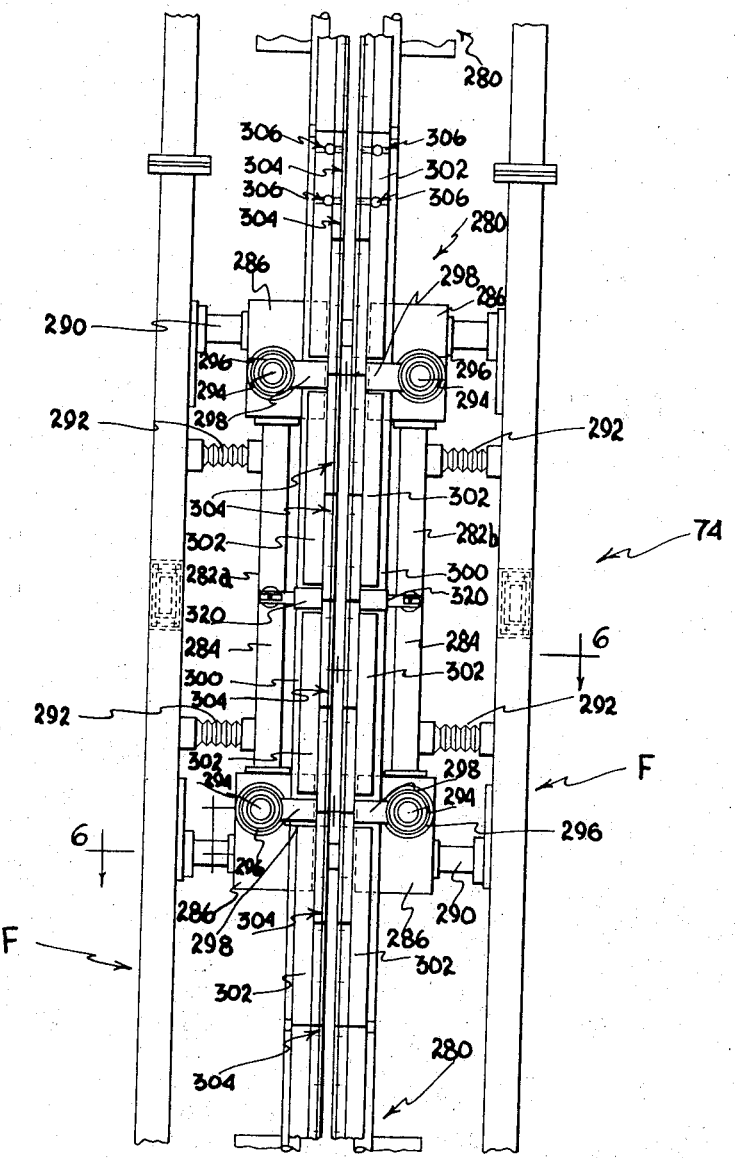
FIG. 7 is a top plan view of a portion of the main burner assembly.

Each module half includes a horizontally extending frame member 284 having a housing 286 fixedly secured to each end. As best seen in FIG. 6, each housing 286 carries a pair of coaxially aligned plain bearings 288 which are slidably supported upon a transversely extending tubular member 290 which is fixedly mounted upon the machine frame F. As best seen in FIG. 7, each module half is supported upon two tubular frame members 290 for horizontal adjustment of the respective module halves 282a and 282b toward and away from each other. Positioning of each module half along its tubular support members 290 is accomplished by a pair of jacks 292 engaged between machine frame F and module frame member 284.

Returning to FIG. 6, each housing 286 supports a vertically extending post 294 fixedly secured to the housing. A sleeve assembly 296 is slidably received on each post 294 and carries a support bracket assembly 298. An elongate pipe 300 is mounted in the two brackets 298 of each module half and extends the entire length of the module. Elongate mounting brackets of generally T-shaped cross-section 302 are fixedly secured, as by welding, to each pipe 300. Each pipe 300 carries four individual brackets 302, the brackets being spaced from each other to provide clearance at the points at which clamps 298 engage pipe 300 and also at a point approximately midway between clamps 298 for structure to be described below.

Brackets 302 provide a mounting platform for a series of elongate individual burner units designated generally 304, there being eight burner units supported in end-to-end relationship on each module half 282a and 282b. Referring to FIG. 6, the burner units 304 are releasably clamped upon bracket 302 by clamp assemblies designated generally 306, each of which includes a pivoted clamping finger 308 which is locked in the clamping position shown in FIG. 15 by a knob 310 threadably received upon a clamping bolt 312. Pin 314 mounted in bracket 302 is engaged within grooves 316 in the bottom of each burner unit 304 to cooperate with clamps 306 in locating the burner upon its bracket. Two pins 314 and two clamping units 306 are employed to mount each burner unit 304 upon the brackets, one clamping unit and pin being located adjacent each end of each burner unit. Due to the scale of FIG. 7, clamping units 306 have been indicated only on one set of burner units 304 at the upper end of the module 280 as viewed in FIG. 7.

Vertical positioning of the burner units is accomplished by means of a pair of jacks 318, a jack 318 being mounted upon each of housings 286 and acting between the housing and the associated sleeve mounted support bracket 298.

Figure 8:
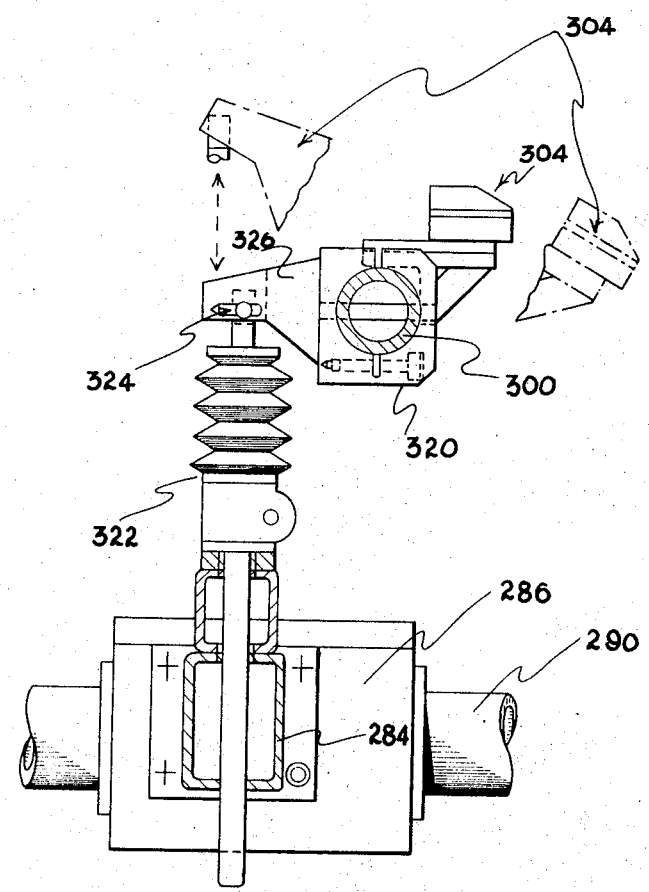
FIG. 8 is a detail cross-sectional view of the burner assembly showing the mechanism for pivotally adjusting the burners.

Pipe 300 is supported in brackets 298 for rotation about the pipe axis within brackets 298. This enables an angular adjustment of burner units 304 about the pipe axis by rotating the pipe within clamp assemblies 298. Referring to FIG. 8, a clamp 320 is fixedly secured to pipe 300 at a location approximately midway between clamps 298. A jack 322 is mounted upon module frame member 284 and coupled by a pin and slot connection designated generally 324 to a crank arm 326 fixedly secured to clamp 320. As indicated by the broken line showing of FIG. 8, actuation of jack 322 causes rotation of pipe 300 about its axis, thus pivoting the burner about the pipe axis. Because the burners on the opposed module halves 282a and 282b are spaced from each other by a distance which provides only a small clearance for the passage of containers C through the burners (see FIG. 6), pivotal adjustment of the burners usually requires a coordinated horizontal and vertical adjustment of the burner location by appropriate manipulation of jacks 292 and 318.

Burner units 304 are of a laminated or built-up layer type of construction, this construction being best shown in the cross-sectional view of FIG. 4. The individual layers of the burner unit are formed from appropriate lengths of bar or strip stock, each burner unit having a typical length of about one foot. The unit includes an upper housing member 330, whose flat bottom surface 332 is formed with a longitudinally extending recess 334 which extends almost, but not quite, the entire length of housing 330, recess 334 terminating just short of each end of member 330. An inlet passage 336 extends from the rear wall 338 of housing 330 to communicate at its inner end with a vertical passage 340 which opens into recess 334. The outer end of passage 336 is formed with an internal screw thread as at 342 to receive a supply conduit fitting.

Figure 5:
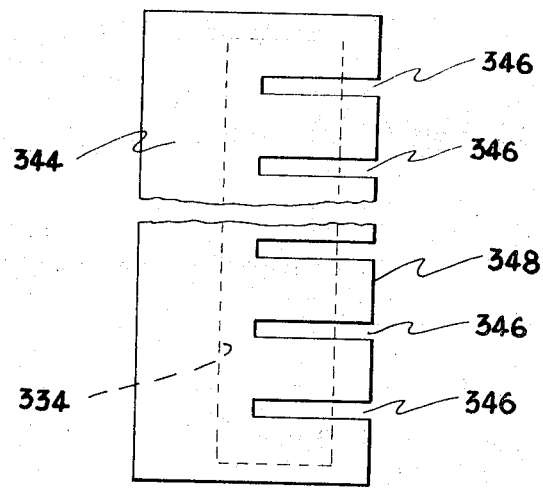
FIG. 5 is a detail plan view showing a portion of a burner shim.

A burner shim 344 is located in face-to-face engagement with the bottom surface of housing member 330. Shim 344 is the same length and width as is housing 330 and is formed, as best seen in FIG. 5, with a plurality of uniformly spaced parallel slots 346 which extend rearwardly from the forward edge 348 of the shim. As indicated in broken line in FIG. 5, recess 334 overlies the inner ends of slots 346 so that the slots are in communication with recess 334 and thus, via passage 340, with inlet passage 336.

Shim 334, in turn, lies upon the top of an intermediate plate 350 having a recess 352 formed in its top surface, recess 352 being of the same overall dimensions and vertically aligned with recess 334 of upper housing member 330. The two recesses 334 and 352 cooperatively define a common chamber split by shim 344, the chamber having an inlet constituted by inlet passage 336 and passage 340 and having a plurality of outlets constituted by slots 346.

A second shim plate 354 underlies intermediate plate 350, shim 354 being of the same length as the other components of burner 70, but being of a reduced width so that its forward edge 356 is spaced inwardly from the forward edge of the burner unit in approximate vertical alignment with the inner ends of slots 346 of the burner shim.

Shim 354 is located on the top surface of a lower housing member 358 which, like upper housing member 330, is constructed with an elongate recess 360 of a configuration similar to that of recess 334. An inlet passage 362 extends forwardly from the rear wall of lower housing member 358 to communicate with a vertical passage 364. An internal thread section 366 at the read end of passage 362 is provided for the connection of a supply fitting.

The various elements described above are clamped into assembled relationship with each other as by a plurality of machine screws 368 which pass through bores in upper housing member 330, shim 334, plate 350, shim 354 and are threaded into tapped bores in lower housing member 358.

In operation, a combustible gas under pressure is supplied to inlet passage 336, and passes through passage 340 into the chamber cooperatively defined by recesses 334 and 352. The gas passes outwardly through slots 346 in the burner shim to establish a linear row of flame jets along the front edge of the burner unit, slots 346 constituting flame ports or nozzles.

In the moil severing operation, it is desired to concentrate the applied heat from the flame jets of burner units 304 to an extremely narrow band-like region of the container so that the line of severance is maintained within close tolerances. Burner unit 304, by employing shim 344 to establish the vertical dimension of the flame ports, enables the achievement of a linear row of accurately aligned, vertically narrow flame jets. Because shims 344 can be readily replaced, they also provide for great flexibility in modifying the operating characteristics of the burners by the employment of shims of different thicknesses, slot dimensions and/or slot spacings.

For example, while the application of a very narrow band of heat to the container during the moil severing operation for precisely locating the line of severance on the container may be desirable; during the subsequent finish forming operation, it may be desirable to apply heat over a somewhat wider band, in which case a thicker shim 344 would be employed. Further, the working temperatures of the glass container during the finish forming operation may not need to be as high as the desired flame temperature during severing, in which case different fuels might be employed as between the severing and finish forming operations, together with different flame port configurations which can easily be established by varying the thickness of the shims employed in the respective operations as to thickness, the slot dimensions and slot spacing.

During operation of the burner unit, air under pressure is supplied to passage 362 and discharged from the burner unit through the continuous slot 370 established between intermediate plate 350 and lower housing 358 by shim 354. The air employed for this purpose is normally at ambient temperature and establishes a sharp thermal gradient in the glass during the severing operation, as well as exerting a cooling effect on the burner unit.

SPIN CYCLE MECHANISM

Details of the spin cycle mechanisms are disclosed in U. S. Pat. No. 3,726,559, of which the present application is a divisional application, and also in a commonly owned copending divisional application of U. S. Pat. No. 3,726,559, identified as Ser. No. 284,700, filed Aug. 30, 1972.

CHAIN LUBRICATION SYSTEM

Details of the chain lubrication system 92 are disclosed in U. S. Pat. No. 3,726,559, of which the present application is a divisional application and are also the subject matter of copending divisional application Ser. No. 267,677 filed June 29, 1972.

While we have described one embodiment of our invention it will be apparent to those skilled in the art that the disclosed embodiment may be modified. Therefore, the foregoing description is to be considered exemplary rather than limiting and the true scope of the invention is that defined in the following claims.

We claim:

1. A burner assembly for establishing a linear row of flame jets comprising an elongate upper housing member having a planar bottom surface termianting at a longitudinally extending front edge, a lower housing member having a planar top surface coextensive with the bottom surface of said upper member and terminating at a longitudinally extending front edge, a shim plate coextensive with said planar surfaces and clampingly secured in face-to-face engagement therebetween, said shim plate having a front edge coextensive with the respective front edges of said upper and lower housing members and a plurality of slots extending rearwardly from the front edge of said plate between said housing members, the planar surface of at least one of said members having an elongate recess extending in parallel rearwardly spaced relationship to the front edge thereof to define an internal passage communicating with the slots in said shim plate, and means for supplying a combustible gas under pressure to said recess.

2. A burner assembly as defined in claim 1 wherein said lower housing member has a planar bottom surface extending parallel to its planar upper surface, a second shim plate mounted in face-to-face engagement with said bottom surface of said lower member and having a front edge extending parallel to and rearwardly spaced from the front edge of said lower housing member, an elongate base member clampingly secured to the bottom of second shim plate and having a front edge aligned with the front edge of said lower member, means defining an elongate recess in the upper surface of said base member extending parallel to said front edge of said base member in underlying relationship with the front edge of said second shim plate, and means for supplying air under pressure to said recess.

* * * * *